United States Patent
Weis et al.

(10) Patent No.: US 11,945,361 B2
(45) Date of Patent: Apr. 2, 2024

(54) LOAD STABILIZER FOR STABILIZING LOADS TRANSPORTED BY A GROUND VEHICLE

(71) Applicant: The Hershey Company, Hershey, PA (US)

(72) Inventors: Steven A. Weis, Harrisburg, PA (US); Michael J. Cassettari, Palmyra, PA (US); Nathaniel Kissel, Hummelstown, PA (US)

(73) Assignee: The Hershey Company, Hershey, PA (US)

( * ) Notice: Subject to any disclaimer, the term of this patent is extended or adjusted under 35 U.S.C. 154(b) by 629 days.

(21) Appl. No.: 17/154,747

(22) Filed: Jan. 21, 2021

(65) Prior Publication Data

US 2022/0227283 A1    Jul. 21, 2022

(51) Int. Cl.
*B60P 7/14* (2006.01)
*B60P 1/02* (2006.01)
*B60P 1/52* (2006.01)

(52) U.S. Cl.
CPC ................. *B60P 7/14* (2013.01); *B60P 1/02* (2013.01); *B60P 1/52* (2013.01)

(58) Field of Classification Search
CPC .............. B60P 7/14; B60P 1/02; B60P 1/52
USPC ............................................... 410/129
See application file for complete search history.

(56) References Cited

U.S. PATENT DOCUMENTS

| | | | |
|---|---|---|---|
| 2,661,857 A | 12/1953 | Mcnutt | |
| 3,773,202 A | 11/1973 | Dutra, Jr. | |
| 4,354,795 A | 10/1982 | Dutra, Jr. | |
| 4,536,119 A | 8/1985 | Miaskoff | |
| 5,509,774 A | 4/1996 | Yoo | |
| 5,525,884 A | 6/1996 | Sugiura et al. | |
| 5,618,159 A | 4/1997 | Wilson | |
| 6,082,797 A | 7/2000 | Antonette | |

(Continued)

FOREIGN PATENT DOCUMENTS

| | | |
|---|---|---|
| CN | 108861427 A | 11/2018 |
| CN | 109466903 A | 3/2019 |

OTHER PUBLICATIONS

International Search Report and Written Opinion received for PCT Patent Application No. PCT/US2021/072290, dated Jan. 28, 2022, 13 pages.

(Continued)

*Primary Examiner* — Hilary L Gutman
(74) *Attorney, Agent, or Firm* — SHOOK, HARDY & BACON L.L.P.

(57) ABSTRACT

A ground vehicle for transporting loads comprises a load stabilizer to provide additional stability of the load during transport. The load stabilizer includes a securing arm coupled to a support frame that is coupled to a pad. The securing arm is also configured to movably mate with the ground vehicle. When a load is placed onto the ground vehicle, the load stabilizer is positioned so that the pad contacts the load to provide stability. The load stabilizer is positioned by actuating a motor, such as a stepper motor. The motor stops when it reaches a torque threshold placed on the motor through contact of the load stabilizer with the load. This mechanism allows for a lightweight load stabilizer that minimally affects the center of mass of the ground vehicle, while at the same time, provides a consistent load-stabilizing force that reduces the likelihood of damage to the load.

20 Claims, 6 Drawing Sheets

(56) References Cited

U.S. PATENT DOCUMENTS

| | | |
|---|---|---|
| 6,379,104 B1 | 4/2002 | Domino et al. |
| 7,213,684 B2 | 5/2007 | Bruns et al. |
| 7,670,555 B2 | 3/2010 | Hoover et al. |
| 10,437,255 B1 | 10/2019 | Theobald |
| 2009/0008951 A1 | 1/2009 | Whetstine et al. |
| 2018/0002126 A1 | 1/2018 | Gonzales et al. |
| 2018/0072548 A1 | 3/2018 | Hokanson |
| 2019/0135551 A1 | 5/2019 | Sekich et al. |

OTHER PUBLICATIONS

International Preliminary Report on Patentability received for PCT Patent Application No. PCT/US2021/072290, dated Aug. 3, 2023, 8 pages.

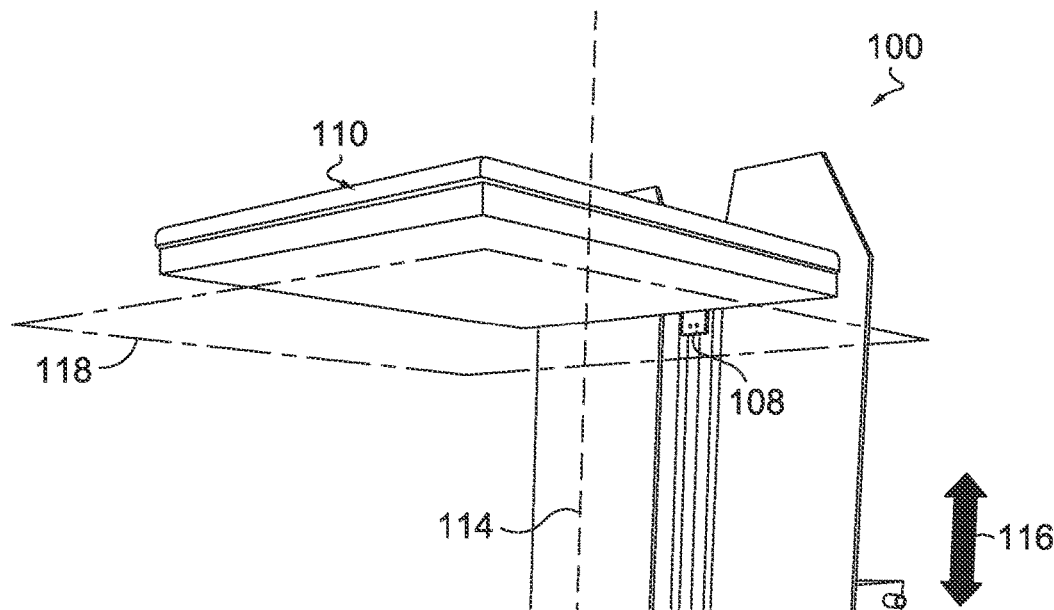
FIG. 1.
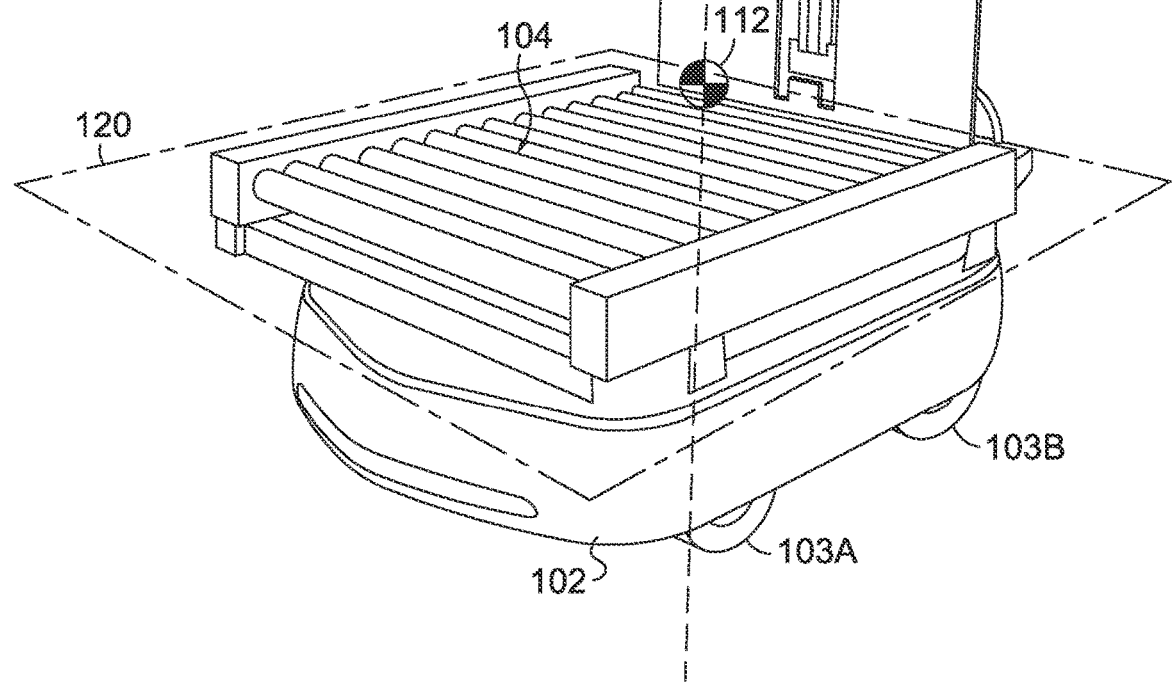

LOAD STABILIZER FOR STABILIZING LOADS TRANSPORTED BY A GROUND VEHICLE

BACKGROUND

In industry, ground vehicles are generally used to move heavy or large loads within facilities. One traditional example is a forklift, which includes multiple "forks" that can be inserted into a pallet to raise and lower loads resting on the pallet. By raising the load off the floor, the forklift can then move the load from one location to the next. Most ground vehicles, like the forklift, include a cab or other control area that supports a human driver or human operator who controls the ground vehicle and movement of the load.

Some ground vehicles include a counterweight. The counterweight's role is to lower the center of mass of the vehicle and counteract the change in weight distribution as the ground vehicle raises or lowers the load. For example, in a forklift, the counterweight is located opposite the forks that raise and lower the load, and generally located low to the ground to lower the ground vehicle's center of mass.

Recently, industries have started using autonomous ground vehicles that do not have a human driver or operator. Many of these autonomous systems use traditional designs, such as a fork lifting system or scissor lifting system, for lifting and moving loads.

Both manned and autonomous ground systems are not only concerned with the systems' center of mass, but they are also concerned about load stability when the system is in motion. Many traditional designs do not include additional measures to enhance load stability, as their main use is to move symmetrical, heavy loads that have less risk of becoming unstable and tipping to the side. Other lift systems are restricted to lifting loads with a maximum height. Further, other systems are designed to have a wide turn radius to lower the horizontal forces applied on the load when engaged in a turning motion.

SUMMARY

At a high level, aspects described herein include a load stabilizer and a ground vehicle using the load stabilizer. The load stabilizer provides additional stability to a load being transported by the ground vehicle, while at the same time, being lightweight so that it minimally affects the center of mass of the ground vehicle.

One example includes a load stabilizer having a securing arm that is configured at one end to movably mate with the ground vehicle. At the other end, the securing arm is coupled to a support frame that supports a pad coupled to the support frame. The securing arm is formed of a strong material that resists bending or becoming damage from the force applied by the mass of the support frame and pad. The support frame is a lightweight material that can support releasable coupling of the pad, making it removable. The pad includes a foam that is equal to or less than about two inches thick.

The ground vehicle includes a motor, such as a stepper motor, servomotor, or the like with a motor control brake. The motor and break may provide servo functionality for the load stabilizer. The motor is configured to move the load stabilizer. The motor can move the load stabilizer by actuating a shuttle, such as a lift mechanism, where the load stabilizer is secured to the shuttle at the securing arm. Some motors include a brake, such as a controller for a stepper motor or a solenoid switch for a servomotor, and the brake includes an associated torque threshold. The brake stops the motor when it experiences a torque equal to or greater than the torque threshold. One specific example type of stepper motor suitable for use is an integrated closed-loop stepper motor that is a single unit comprising motor, drive electronics and position sensor. The electronic control board is attached to the motor, and it includes control electronics, power stage, and magnetic encoder. Other types of stepper motors may be suitable for use in addition to or in lieu of this example.

In operation, the ground vehicle receives a load for transport. The ground vehicle actuates the motor to move the load stabilizer toward the load. As the pad of the load stabilizer contacts the load and exerts a force on the load, the motor experiences a torque force. When the torque force experienced by the motor meets or exceeds the torque threshold, the brake stops the motor. This provides a consistent way to determine a stopping position of the load stabilizer in a manner where the load stabilizer does not damage the load. Further, the motor provides the force applied by the pad to the load, as opposed to the weight of the load stabilizer, thus allowing a lightweight load stabilizer, which reduces the effect on the center of mass of the ground vehicle.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached figures, wherein:

FIG. 1 illustrates a side perspective view of an example ground vehicle having a load stabilizer, in accordance with an aspect described herein;

DETAILED DESCRIPTION

Figure 2:
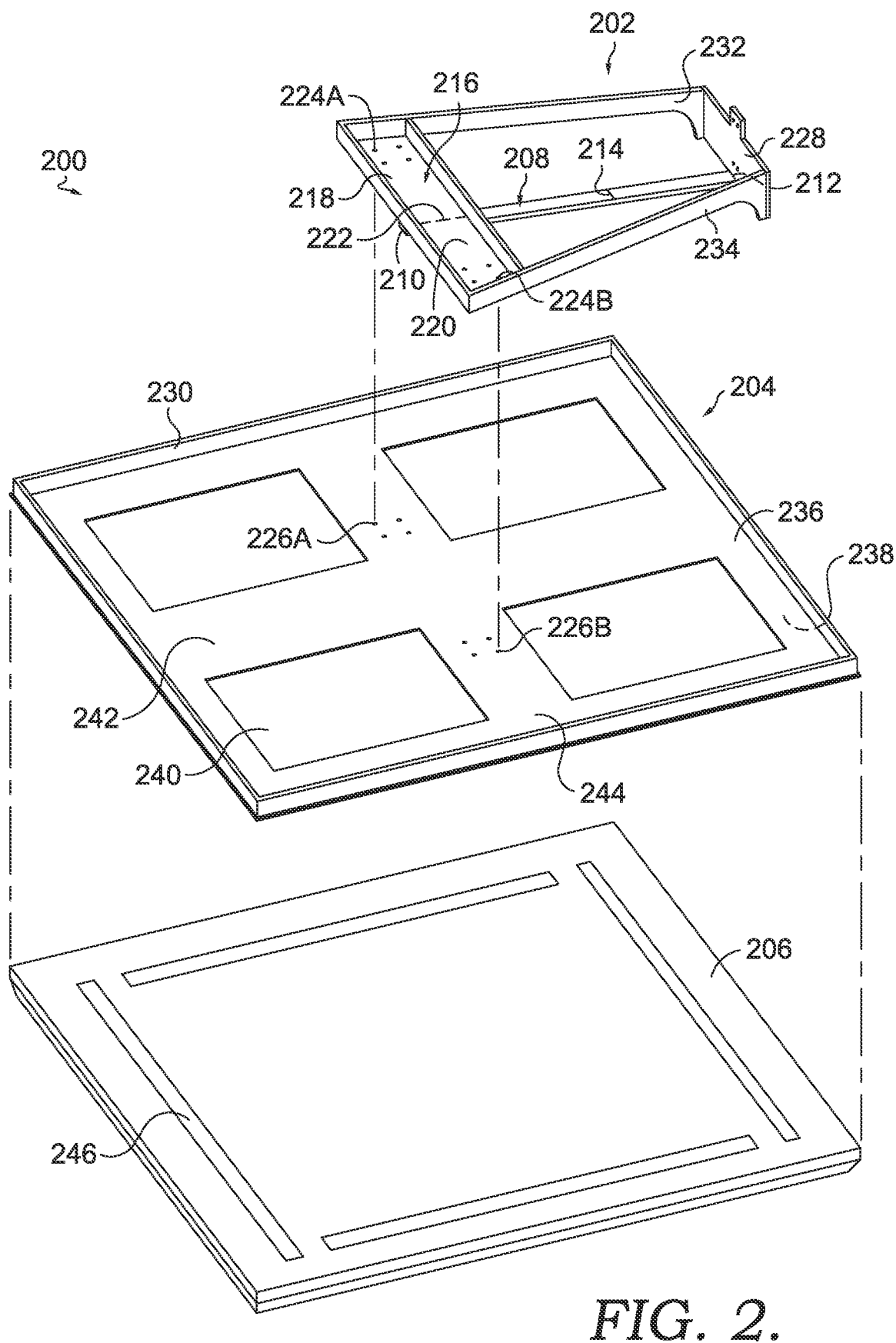
FIG. 2 illustrates an exploded view of an example load stabilizer that can be employed by the ground vehicle of FIG. 1, in accordance with an aspect described herein.

Aspects of the disclosure relate to a load stabilizer that is configured for use with a ground vehicle to assist in stabilizing loads transported by the ground vehicle. Such ground vehicles can be manned or unmanned systems, and they are generally used in industry to transport heavy or large objects.

One example aspect generally provides for a lightweight load stabilizer that is positioned above a load-receiving area of the ground vehicle where a load is placed during transit. The load stabilizer is lightweight relative to the ground vehicle system as a whole.

The load stabilizer can be raised and lowered relative to the load-receiving area of the ground vehicle. When a load is placed on the load-receiving area for transport, the load stabilizer is lowered, contacts the load, and applies a force to the load. Thus, when the ground vehicle is in motion, the load is less likely to tip. This allows the ground vehicle to move at higher speeds and allows for a sharper turn radius, since tipping of the load is less likely.

As noted, some conventional ground vehicle systems have encountered problems when the center of mass of the vehicle changes. For instance, as part of a ground vehicle having mass is moved upward, the overall center of mass of the ground vehicle raises.

To overcome this conventional problem, the disclosed load stabilizer is lightweight relative to the ground vehicle as a whole. By making the load stabilizer relatively lightweight, the raising and lowering of the load stabilizer has little effect on the ground vehicle's center of mass. In turn, this makes for a safer ground vehicle.

Other conventional problems with ground vehicles when transporting loads occur when the center of mass moves horizontally based on whether the ground vehicle is carrying a load. For example, this occurs with a conventional forklift. As the forklift picks up a load on the front end, the center of mass moves toward the load, making the forklift more likely to tip toward the load. As a result, forklifts, and other similar ground vehicle systems apply counterweights on the opposite end. This, however, makes such systems extremely heavy, thus limiting where the system can be employed and how the system is transported and maintained.

One design of the load stabilizer that will be further described provides for a load stabilizer that is directly positioned above the load-receiving area of the ground vehicle. This design allows for little to no horizontal deviation in the center of mass of the ground vehicle when the load stabilizer is raised and lowered, helping to prevent tipping, and reducing or eliminating the need for counterweights.

Accordingly, one example includes a load stabilizer comprising a securing arm, a support frame, and a pad. The securing arm is configured to secure to a ground vehicle that employs the load stabilizer. The securing arm includes a securing arm shaft that has a first securing arm shaft end extending to a second securing arm shaft end. The securing arm is coupled to the support frame at the first securing arm shaft end, and the second securing arm shaft end is configured to engage a shuttle, such as a lift mechanism shuttle, of the ground vehicle that is movable by the motor.

The securing arm is coupled to the support frame at a first support frame side using, for example, a securing arm bracket that is transversely coupled to the securing arm at the first securing arm shaft end. The pad is then coupled to the support frame at a second support frame side that is opposite the first support frame side. The ground vehicle utilizes the load stabilizer by moving the load stabilizer to a position where the pad is in contact with the load and applying force to the load.

For added strength, the securing arm can comprise a relatively strong material. For instance, the securing arm can comprise metals such as iron, tungsten, titanium, nickel, and chromium.

The support frame to which the securing arm is coupled generally provides support for the pad. The support frame can comprise lightweight materials, such as metals of aluminum, magnesium, titanium, or beryllium.

The support frame includes an outer edge, and the securing arm is coupled to the support frame at a location within the outer edge. The securing arm can be coupled to the support frame so that a portion of the securing arm extends beyond the outer edge to easily engage the shuttle of the ground vehicle. To further reduce weight, the support frame can have an opening enclosed by the outer edge of the support frame.

The pad is coupled to the support frame on the second support frame side. When coupled, the pad can extend to or beyond the outer edge of the support frame. In some cases, the pad is removably coupled to the support frame so that the pad can be easily and quickly changed if there is any damage or wear. Hook-and-loop fasteners can be applied to the support frame and the pad as one example to removably secure the pad.

Generally, the pad can be made of any material having some flexibility. Foam padding is one example suitable for use. One specific example of foam that has beneficial durability includes a closed-cell foam material, such as a closed-cell polyurethane or polyethylene. In one example, the pad has a thickness equal to or less than two inches.

The load stabilizer can be used with the ground vehicle by mating the securing arm with the shuttle of the ground vehicle. In one configuration, when the securing arm is mated to the shuttle, the load stabilizer is positioned so that the pad is directly above the load-receiving area of the ground vehicle.

To utilize the load stabilizer, the ground vehicle actuates a motor that is configured to move the shuttle from a first position to a second position. In doing so, the lift mechanism shuttle moves the securing arm of the load stabilizer from a first securing arm position toward a second securing arm position. The second securing arm position places the pad in contact with the top of the load at the load-receiving area on the ground vehicle. The second position of the shuttle is determined, and may also be maintained, by the torque limit associated with the brake of the motor. An upper or lower limit for the shuttle can be determined by a limit switch, which may fix these limits at particular positions such that the shuttle is not moved by the motor beyond the upper or lower limit.

In operation, the ground vehicle receives a load onto the load-receiving area. On the load-receiving area, the load is disposed between the load-receiving area and the load stabilizer. The ground vehicle actuates the motor to begin moving the load stabilizer closer to the load. As the pad contacts the load and force is applied, the motor experiences an increasing torque. When the torque reaches the torque threshold value of the brake, the brake stops the motor. In this way, the load stabilizer is configured to apply a consistent pressure to the load.

This method of utilizing the load stabilizer to apply pressure to the load is beneficial because it provides consistent pressure across loads of different sizes. Further, different loads have different crush values, the point at which the load is damaged by the force. The accuracy and precision of this method helps to ensure that loads having different crush values are not damaged by the load stabilizer.

Further, although the load stabilizer can be used with manned or unmanned ground vehicle systems, the use of the motor with the brake activated based on torque is particularly beneficial for autonomous ground vehicles. This is because it provides a method for stopping the load stabilizer at the correct position without the use of a human input, thus ensuring that a consistent and correct pressure is applied to the load without damaging it.

The preceding example is just one example that can be practiced using the technology that is described with reference to the figures.

With reference now to FIG. 1, FIG. 1 illustrates an example ground vehicle 100 in which the disclosed technology may be employed. Ground vehicle 100 is illustrated as an autonomous ground vehicle. However, as noted, any of the aspects described herein may also be employed in a manned ground vehicle unless explicitly recited otherwise.

Ground vehicle 100 is illustrated as having vehicle base 102, load-receiving area 104, track 106, lift mechanism shuttle 108, and load stabilizer 110. It will be recognized that this illustration is a simple example provided to assist in describing the technology. Additional components, fewer components, and different arrangements, including any of those that will be discussed, may be alternatively employed. Since various ground vehicles for transporting loads are known in the art, only a few specific arrangements are illustrated and described in this disclosure; however, it is intended and will be understood that the load stabilizer can be employed on any number of ground vehicle systems, both manned and autonomous.

As for the illustrated example in FIG. 1, ground vehicle 100 includes vehicle base 102. Vehicle base 102 generally moves ground vehicle 100 from one location to another and positions ground vehicle for receiving and off-loading loads.

In an aspect, vehicle base 102 includes an autonomous guidance system that determines and controls the position of ground vehicle 100. Autonomous navigation systems are known in the art. Such systems may employ any number of sensors hosted by ground vehicle 100, including lasers, optical visions sensors, sonar, and so forth, to move and position ground vehicle 100 into a particular location or orientation, and to perform obstacle avoidance maneuvers. It will be appreciated that the autonomous navigation system and sensors are not restricted to vehicle base 102, and they may be located on other areas of ground vehicle 100 or remote from ground vehicle 100, communicating with ground vehicle 100 through wireless or direct communication channels.

Vehicle base 102 is illustrated as including wheels 103A and 103B that position and move ground vehicle 100. While illustrated as having wheels 103A and 103B, vehicle base 102 can have any motion system, including a track system, an air system, rollers, and the like. In this example, the wheels of the motion system for vehicle base 102 are vertically aligned with center of mass 112 for ground vehicle 100, as illustrated via theoretical vertical line 114 extending through vehicle base 102 and center of mass 112.

Ground vehicle 100 is further illustrated as having load-receiving area 104. Generally, load-receiving area 104 is a location where a load can be placed for transport by ground vehicle 100.

As shown, load-receiving area 104 includes rollers to aid in receiving and off-loading loads. Other positioning systems can be employed in addition to or in lieu of the rollers, including conveyors, air systems, mechanical pushers, and the like. The positioning system can also assist in positioning the load onto load-receiving area 104, such that the load is positioned in vertical alignment with center of mass 112. In another aspect, load-receiving area 104 does not include a positioning system, and instead, includes a flat area where the load is placed.

Load-receiving area 104 can be vertically aligned with center of mass 112, as illustrated using theoretical vertical line 114 in FIG. 1. Here, load-receiving area 104 is positioned directly above vehicle base 102.

Ground vehicle 100 further includes track 106 and shuttle 108. Ground vehicle 100 utilizes track 106 and shuttle 108 to position load stabilizer 110. In the illustrated aspect, track 106 and shuttle 108 are used to vertically position load stabilizer 110. In one case, shuttle 108 may be included as part of a lift mechanism system, and be referred to as a lift mechanism shuttle. The lift mechanism shuttle moves load stabilizer 110 along a vertical axis. In one instance, track 106 and shuttle 108 are used to transition load stabilizer 110 vertically relative to vehicle base 102 from a first position having a first distance from load stabilizer 110 to load-receiving area 104 that is greater than a second distance of a second position from load stabilizer 110 to load-receiving area 104. The vertical direction of movement is illustrated using arrow 116. Shuttle 108 may be part of an overall system and may include one or more shuttle components. While illustrated as a part of ground vehicle 100 or a part separate from ground vehicle 100, other aspects include shuttle 108 as part of load stabilizer 110, which may be a separate component or integrally formed as part of other components of load stabilizer 110. In an aspect, shuttle 108 is part of another movement mechanism for moving load stabilizer 110 and is used with other movement mechanism components that do not include track 106.

In general, load stabilizer 110 is operated by ground vehicle 100 to apply pressure to a load placed on load-receiving area 104 in order to provide additional stability to the load during transport.

As illustrated, load stabilizer 110 mates with shuttle 108 of ground vehicle 100. Load stabilizer 110 is vertically raised and lowered along track 106 by shuttle 108 in order to engage a load positioned on load-receiving area 104.

In this example, load stabilizer 110 is positioned generally parallel to load-receiving area 104. That is, load stabilizer 110 extends along a theoretical top plane 118, while load-receiving area 104 extends along a theoretical bottom plane 120. Top plane 118 and bottom plane 120 are parallel and offset from each other.

In FIG. 1, load stabilizer 110 is positioned perpendicular to track 106 for raising and lowering load stabilizer 110. More specifically, top plane 118 along which load stabilizer 110 extends, is perpendicular to theoretical vertical line 114. Similarly, load-receiving area 104 is perpendicular to track 106, in that bottom plane 120, along which load-receiving area 104 extends, is perpendicular to theoretical vertical line 114.

With reference now to FIG. 2, an exploded view of load stabilizer 200 is provided. Load stabilizer 200 is one type of load stabilizer suitable for use as load stabilizer 110 described with reference to FIG. 1. Load stabilizer 200 is an example of a type of load stabilizer that can be practiced from the disclosed technology. Each component of load stabilizer 200 is also provided as an illustrative example with the understanding that other designs and arrangements can be derived and practiced from this disclosure.

The example load stabilizer 200 of FIG. 2 is illustrated having securing arm 202, support frame 204, and pad 206. In general, securing arm 202 is configured to mate with a ground vehicle (e.g., ground vehicle 100), such that the ground vehicle positions load stabilizer 200 by moving securing arm 202 from a first securing arm position to a second securing arm position. Support frame 204 generally supports pad 206 and provides a mechanism by which pad 206 can be retained within load stabilizer 200. Generally, pad 206 provides a point of contact for the load.

Securing arm 202 is shown having securing arm shaft 208 that extends from first securing arm shaft end 210 to second securing arm shaft end 212, illustrated in FIG. 2 as separated by theoretical shaft line 214. First securing arm shaft end 210 is opposite second securing arm shaft end 212. The word "shaft" is not meant to imply any particular shape or design, only that the material extends from a first end to a second end.

First securing arm shaft end 210 is configured to couple to support frame 204. Second securing arm shaft end 212 is configured to mate with a shuttle or similar mechanism of a ground vehicle for positioning load stabilizer 200.

One method of coupling securing arm 202 to support frame 204 at first securing arm shaft end 210 is by way of securing arm bracket 216. In the aspect shown, securing arm bracket 216 is transversely coupled to securing arm shaft 208 at first securing arm shaft end 210. Securing arm bracket 216 comprises first securing arm bracket end 218 and second securing arm bracket end 220 illustrated as separated by theoretical bracket line 222. Securing arm bracket 216 can be fastened to support frame 204 at both first securing arm bracket end 218 and second securing arm bracket end 220. By coupling securing arm 202 using securing arm shaft 208 transversely coupled to securing arm bracket 216, the overall weight of securing arm 202 can be reduced. This T-shaped design both reduces the overall weight and provides a mechanism for coupling securing arm 202 to support frame 204 in a manner that reduces the forces applied to the junction where the components are coupled, as this design reduces rotational force applied to the point at which the components are coupled. As illustrated in FIG. 2, securing arm bracket 216 includes holes 224A and 224B that correspond to holes 226A and 226B on support frame 204. These can be used to fasten the components using pins, bolts, and the like. It will be understood that this is just an example method suitable for practicing the technology and that other methods of coupling the components are also possible.

Securing arm 202 can be configured to mate with the ground vehicle using securing arm mating bracket 228. Here, securing arm mating bracket 228 is coupled to securing arm shaft 208 at second securing arm shaft end 212.

In FIG. 2, securing arm shaft 208 extends from first securing arm shaft end 210 configured to couple to support frame 204 at a location within support frame outer edge 230. Securing arm shaft 208 extends beyond support frame outer edge 230 to second securing arm shaft end 212. This configuration assists the ground vehicle in positioning load stabilizer 200 because extending securing arm 202 beyond support frame outer edge 230 allows easy movement of load stabilizer 200 when moving securing arm 202, as support frame 204 is out of the way of the ground vehicle and the motion device used by the ground vehicle to position load stabilizer 200.

Securing arm 202 includes first securing arm brace 232 and second securing arm brace 234. First securing arm brace 232 couples to securing arm bracket 216 at first securing arm bracket end 218. First securing arm brace 232 extends from securing arm bracket 216 toward second securing arm shaft end 212. Illustrated here, first securing arm brace 232 couples to securing arm mating bracket 228. Second securing arm brace 234 couples to securing arm bracket 216 at second securing arm bracket end 220. Second securing arm brace 234 extends from securing arm bracket 216 toward second securing arm shaft end 212. Second securing arm brace 234 is also illustrated as coupled to securing arm mating bracket 228. In this example, first securing arm brace 232 and second securing arm brace 234 extend outward and away from securing arm mating bracket 228 in opposite directions, such that first securing arm brace 232 and second securing arm brace 234 extend in a non-parallel relationship to one another. Using securing arm braces such as these helps to increase the stability of securing arm 202. In particular, it reduces or eliminates the rotational forces applied to securing arm shaft 208. At the same time, the use of securing arm braces, including those illustrated, helps to reduce overall weight of securing arm 202 by reducing the amount of material, yet still providing strong structural support.

In some designs, such as that shown in FIG. 2, securing arm 202 experiences a rotational or torque force by virtue of the mass of support frame 204 and pad 206 that exerts a downward force at first securing arm shaft end 210 when securing arm 202 is mated to the ground vehicle at second securing arm shaft end 212. Because of this, it is beneficial to use a strong material that reduces deflection and has a bending force or fail point greater than the rotational or torque force experienced by securing arm 202. For example, securing arm 202 can be formed of a metal comprising iron, tungsten, titanium, nickel, or chromium. This includes alloys thereof, such as forms of steel, which have been found suitable for use.

Support frame 204 comprises first support frame side 236 that is opposite second support frame side 238. As noted previously, support frame 204 includes support frame outer edge 230. Support frame 204 is one example of a type of support frame that can be practiced from the described technology. It will be understood that other configurations and arrangements are possible and may be used. Thus, support frame outer edge 230 is not intended to imply that support frame 204 is entirely enclosed by support frame outer edge 230, such as the example illustrated in FIG. 2. Instead, support frame outer edge 230 is intended to more broadly encompass the outermost locations to which a support frame may extend. For instance, another example support frame is H-shaped, then the outer edge could include the two parallel portions.

Support frame 204 may include one or more open areas, such as open area 240, that are defined by arrangement of the material within support frame 204. In the example aspect of FIG. 2, support frame outer edge 230 entirely encloses the frame. In this case, open area 240 is enclosed by support frame outer edge 230. In the H-shaped example, open areas comprise the locations between the two parallel portions. In this case, the open areas are not entirely enclosed by the outer edge. Open areas within support frame 204 reduce the overall weight of support frame 204 by using less material and providing a more skeleton-like frame. However, in yet another example, a support frame could have no open areas and provide only a flat surface.

As shown in FIG. 2, support frame outer edge 230 fully encloses support frame 204. One or more open areas, such as open area 240, are fully enclosed within support frame outer edge 230. Here, support frame 204 comprises first support frame portion 242 that is perpendicular to second support frame portion 244. This forms a t-shaped structure that extends over the area occupied by support frame 204 and reduces weight by not having material completely covering the entire area. The t-shaped design formed from first support frame portion 242 and second support frame portion 244 is entirely enclosed by support frame outer edge 230 to provide additional strength and form to support frame 204.

Support frame 204 can be coupled to securing arm 202 at first support frame side 236. As illustrated, securing arm 202 can be coupled to support frame 204 at one or more locations. Securing arm 202 can be coupled to support frame 204 at one or more locations along second support frame portion 244 that extends parallel with securing arm bracket 216 and perpendicular to securing arm shaft 208. In another aspect, securing arm 202 is coupled to one or more locations on first support frame portion 242 (not illustrated), which extends perpendicular to securing arm bracket 216 and parallel with securing arm shaft 208. An aspect couples securing arm 202 to one or more locations on both first support frame portion 242 and second support frame portion 244.

Reducing weight of support frame 204 is beneficial because it reduces the overall weight of load stabilizer 200 and reduces the rotational or torque force experienced by securing arm 202. However, since support frame 204 does not experience the type of forces that are experienced by securing arm 202, lighter materials can be used to construct support frame 204, such as any material having a density less than or equal to about 0.300 lbs/in$^3$. In other aspects, materials having a density less than or equal to about 0.200 lbs/in$^3$ and materials having a density of less than or equal to about 0.100 lbs/in$^3$ are suitable for use. For instance, support frame 204 can be formed of a metal comprising aluminum, magnesium, titanium, or beryllium. Similarly, this is intended to include alloys of these metals. Aluminum having a density of less than 0.100 lbs/in$^3$ has been found to provide good structural stability for coupling to pad 206 and to securing arm 202, while also providing a lightweight material that helps reduce the overall weight of load stabilizer 200.

Pad 206 is coupled to support frame 204 at second support frame side 238. In the example provided by FIG. 2, pad 206 is sized congruent to support frame 204. That is, pad 206 is sized to extend over an area about equal to an area of support frame 204. Pad 206 may comprise a single pad piece or may comprise more than one pad pieces.

Pad 206 is releasably coupled to support frame 204. By releasably coupling pad 206, pad 206 can easily be removed and replaced. There are various methods for releasably securing pad 206 to support frame 204. One suitable method is to use hook-and-loop fasteners, such as hook-and-loop fastener 246 illustrated in FIG. 2. Other methods can include using pins, bolts, double-sided tape, glue, clamps, and the like.

In general, pad 206 can be made of any material. Flexible materials are beneficial in that they cushion or conform to a load when force is applied by load stabilizer 200. Some loads may not be perfectly flat or parallel with the pad, and as such, some areas could experience more force. Flexible materials help to disperse this force across the entire load, rather than have some areas of the load experience significantly greater amounts of force. Flexible materials also help to contour the material to the load, thus providing even more stability of the load during transport, as the contouring helps grip the load and prevent side-to-side motion.

One flexible material that has been found to provide such benefits is a foam material. One type of foam that has been found to be durable and suitable for use is a closed-cell foam material. These resist wear from repeated forces encountered when in use with load stabilizer 200. One example is a closed-cell polyurethane foam, while another is a closed-cell polyethylene foam.

While many different variations of foam can be used, foams having a thickness of less than or equal to about 5 inches are suitable. Foams having a thickness of less than or equal to about 4 inches, less than or equal to about 3 inches, less than or equal to about 2 inches, and less than or equal to about 1 inch can each be used in aspects of the technology. Lower thicknesses of foam used in pad 206 are beneficial in that there is less weight.

Further, foams having densities of less than or equal to about 5 lbs/ft$^3$ may be used. Other aspects of the technology can employ foams having densities of less than or equal to about 4 lbs/ft$^3$, less than or equal to about 3 lbs/ft$^3$, less than or equal to about 2 lbs/ft$^3$, and less than or equal to about 1 lb/ft$^3$. The lower the density, the less weight and increased flexibility.

Any combination of these foams can be used in aspects of the technology. Other similar foams and flexible materials, such as rubber, can be used and are intended to be within the scope of "flexible material." In some case, the flexible material is a flexible, non-metallic, synthetic material.

Figure 3:
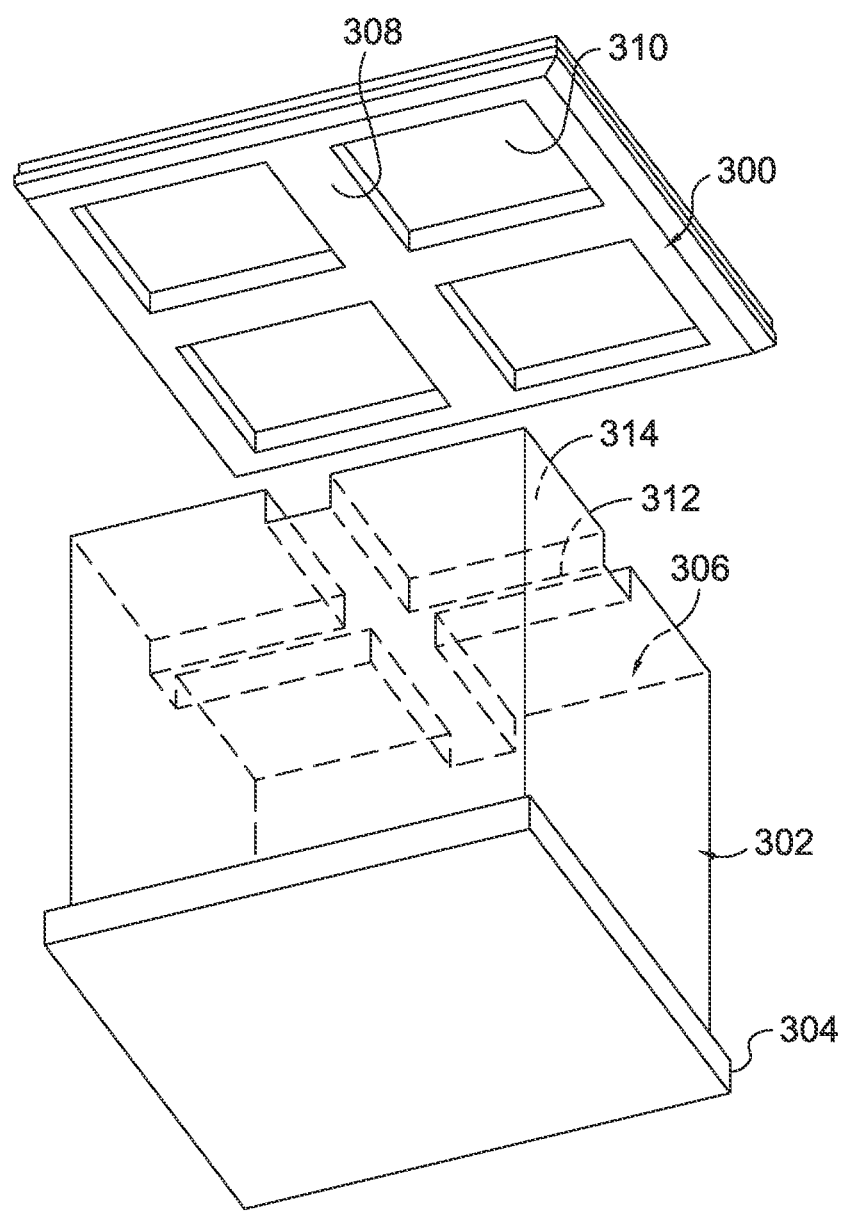
FIG. 3 illustrates an upward view of an example pad and load, in accordance with an aspect described herein.

In general, pad 206 can include a flat surface opposite the portion of pad 206 secured to support frame 204. However, other alternative pad designs are contemplated. FIG. 3 provides an example pad design that may be used.

With reference briefly to FIG. 3, generally a pad can be formed to have a pad surface that corresponds to a surface of a particular load type. This is beneficial because it provides additional support against side-to-side movement of loads that do not have a regular top surface, such as those not having a flat, square top surface. FIG. 3 provides an example; although, it will be understood that there are other pad designs that are intended to be within the scope of this disclosure.

In general, FIG. 3 illustrates a bottom-up view of pad 300 and load 302, which is resting atop pallet 304. Pad 300 includes a pad design that conforms to a shape of load top surface 306. That is, pad 300 includes raised pad areas 308 and recessed pad areas 310. To correspond to load 302, raised pad areas 308 have locations corresponding to locations of recessed load areas 312. Similarly, recessed pad areas 310 have locations corresponding to locations of raised load areas 314. To form raised pad areas 308 and recessed pad areas 310, pad 300 can be milled out or initially formed around a blank having a structure similar to the structure of load top surface 306.

Figure 4:
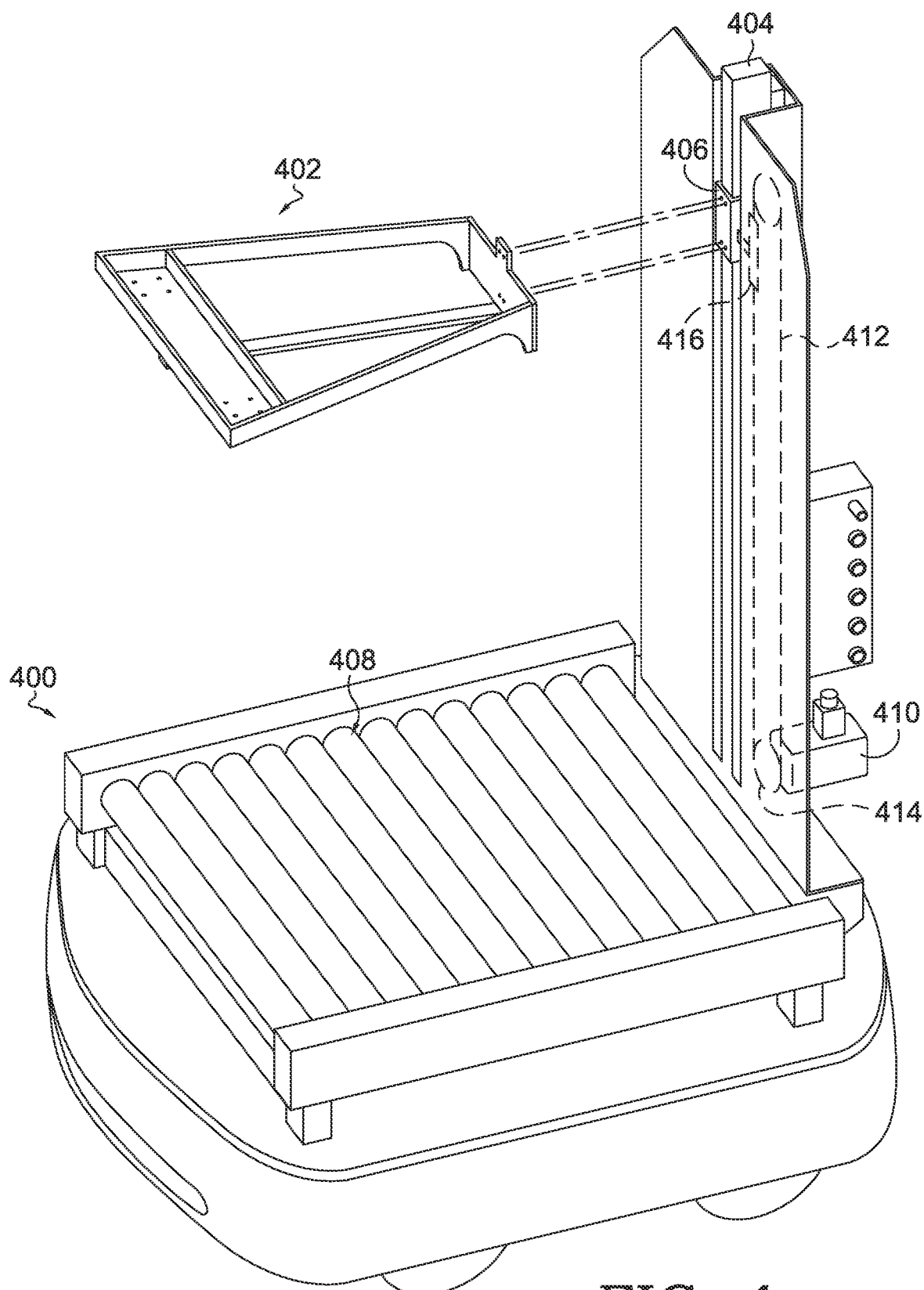
FIG. 4 illustrates a side view of an example ground vehicle employing a motor for positioning a support arm of a load stabilizer, in accordance with an aspect described herein.

Turning now to FIG. 4, an example ground vehicle 400 is provided. Ground vehicle 400 may be any type of ground vehicle configured to transport loads. The autonomous system of FIG. 4 is one example, and other examples may include manned or remotely operated ground vehicles.

Ground vehicle 400 is shown in operation with securing arm 402. Other components of the load stabilizer associated with securing arm 402 have been omitted for clarity. However, it will be appreciated that the securing arm 402 may be used with other components to provide a load stabilizer for ground vehicle 400, and that any of the described load stabilizers are suitable for use.

Ground vehicle 400 positions securing arm 402, and thus any load stabilizer associated with it, using track 404 and shuttle 406. That is, securing arm 402 is configured to mate with shuttle 406 as illustrated. Shuttle 406 is vertically moved about track 404 to move securing arm 402 from a first securing arm position to a second securing arm position, where the second securing arm position is relatively closer to load-receiving area 408. As noted, shuttle 406 may also be referred to or include a lift mechanism shuttle that assist in vertical movement about ground vehicle 400.

The system comprising track 404 and shuttle 406 is illustrated as one example method that can be utilized. Other systems may employ hydraulics, chains, gears, mechanical lifts, and so forth.

Ground vehicle 400 can employ motor 410 for positioning securing arm 402 along track 404. Thus, motor 410 is configured to move securing arm 402 from a first securing arm position to a second securing arm position. That is, ground vehicle 400 actuates motor 410 to move securing arm 402 along track 404. Some aspects of the technology utilize motor 410 having a solenoid brake. The solenoid brake stops motor 410 when motor 410 experiences a specific torque. Some aspects use a stepper motor that is braked by a controller programed with a torque threshold value. It will be understood that, although motor 410 is illustrated as part of ground vehicle 400, motor 410 could be positioned at any location of ground vehicle 400, including positioned on any component of a load stabilizer of ground vehicle 400. It will also be understood that some stepper motors include a brake and controller integrated into the same hardware or that are separate.

A brake integrated with or part of motor 410 can be used to stop securing arm 402 at a lower position when the torque experienced by motor 410 is equal to or greater than the torque threshold defined by the brake. Thus, the lower limit position is based on the size of the load being carried by ground vehicle 400. A capacitive switch can be used to determine an upper limit position of securing arm 402 to stop motor 410. As noted, several motors are suitable for use, including stepper motor, servomotors, and the like. These may work in conjunction with any type of brake, including a solenoid brake, potentiometer, controller, and the like, including digital or mechanical, or both. The brake may have a torque threshold value associated with it that stops the motor when the motor experience a torque equal to or greater than the torque threshold value. In an example, a stepper motor can be used where the controller controls the stepper motor position, and the stepper motor position is determined by the controller based on the stepper motor experiencing a torque equal to or greater than the torque threshold value. In this example, the brake is then applied to the stepper motor to maintain the stepper motor position, thus maintaining a position of a load stabilizer moved by the stepper motor. The brake and the controller of the stepper motor may be integrated into a single piece of hardware or may be separate components.

One benefit to reducing the weight of the overall load stabilizer, using methods previously described, is that the reduced weight allows smaller motors to be used. That is, the weight of the load stabilizer correlates to the size of the motor needed to move the load stabilizer. Higher weighted load stabilizers will generally use larger motors with higher torque thresholds and specifications. By reducing the weight of the load stabilizer, relatively smaller motors can be used, thus requiring less voltage to operate. This allows for smaller batteries and extends battery life for batteries associated with the ground vehicle that are used to power the motor.

While there are various methods to configure motor 410 to move securing arm 402, one method uses a belt system. One example system is illustrated and comprises belt 412 that is moved using pulley 414 joined to motor 410. Shuttle 406 is joined to belt 412 using belt clasp 416. Shuttle 406 is joined to belt 412 such that, when belt 412 is rotated about pulley 414, shuttle 406 moves in the direction of rotation. One specific system suitable for use employs a timing belt having grooves that is rotated around a pulley with teeth, where the teeth of the pulley are configured to rest within the grooves of the timing belt.

Figure 5:
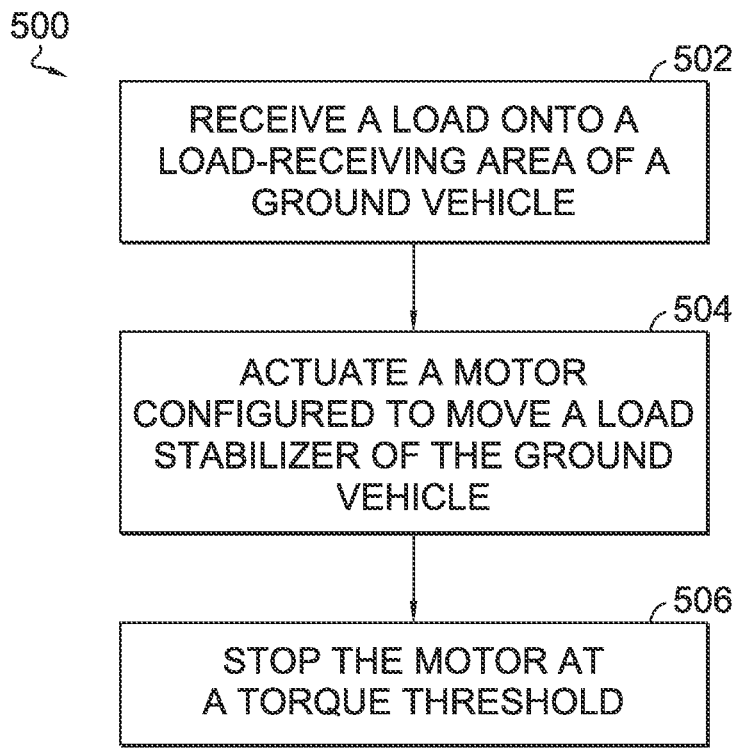
FIG. 5 illustrates an example method of operating a ground vehicle having a load stabilizer, in accordance with an aspect described herein.

With reference now to FIG. 5, an example method 500 of operating a ground vehicle having a load stabilizer is provided. Any load stabilizer or variation of load stabilizer described may be employed. At block 502, a load is received at a load-receiving area of the ground vehicle. The load can be positioned by the ground vehicle to rest in vertical alignment with the center of mass of the ground vehicle. The load can be positioned by a positioning system employed by the ground vehicle or may be placed onto a flat surface of the load-receiving area. In an aspect, the load is positioned so that it is disposed between the load-receiving area and the load stabilizer of the ground vehicle, where the load stabilizer is positioned parallel with the load-receiving area.

At block 504, the ground vehicle actuates a motor that is configured to move the load stabilizer via a securing arm. The load stabilizer is moved from a first securing arm position to a second securing arm position. The second securing arm position is relatively closer to the load and ground level.

As a pad of the load stabilizer begins to contact a surface of the load, the motor moving the load stabilizer begins to experience a torque force. The motor may be configured with a solenoid brake that stops the motor when the experienced torque is equal to or greater than a torque threshold associated with the solenoid brake. Thus, at block 506, motor is stopped based on the torque threshold of the motor. The load stabilizer is stopped at the lower limit position.

Figure 6:
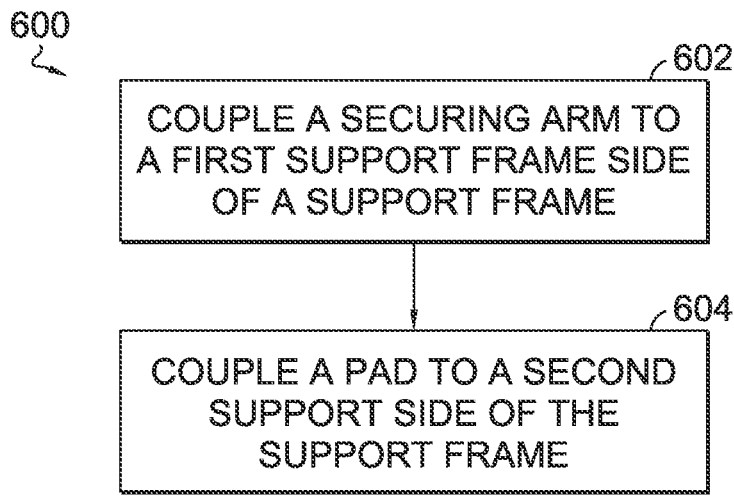
FIG. 6 illustrates an example method of assembling a load stabilizer, in accordance with an aspect described herein.

FIG. 6 illustrates an example method 600 of assembling a load stabilizer configured for use with a ground vehicle. At block 602, a securing arm is coupled to a support frame. The securing arm can be coupled to a first support frame side of the support frame that is opposite a second support frame side of the support frame. The securing arm may include a securing arm shaft having a first securing arm shaft end extending to a second securing arm shaft end. The securing arm can be coupled to the support frame at the first securing arm shaft end at a location within an outer edge of the support frame. The securing arm can be coupled such that the second securing arm shaft end extends beyond the outer edge of the support frame. The support frame can be configured to movably mate with the ground vehicle at a location corresponding to the second securing arm shaft end.

At block 604, a pad is coupled to the support frame. The pad can be coupled to the support frame at the second support frame side. The pad may be removably coupled to the second support frame side. In an aspect, a first part of a hook-and-loop fastener is secured to the pad, while a second corresponding part is secured to the second support frame side of the support frame, and the first and second parts are placed in contact.

Figure 7:
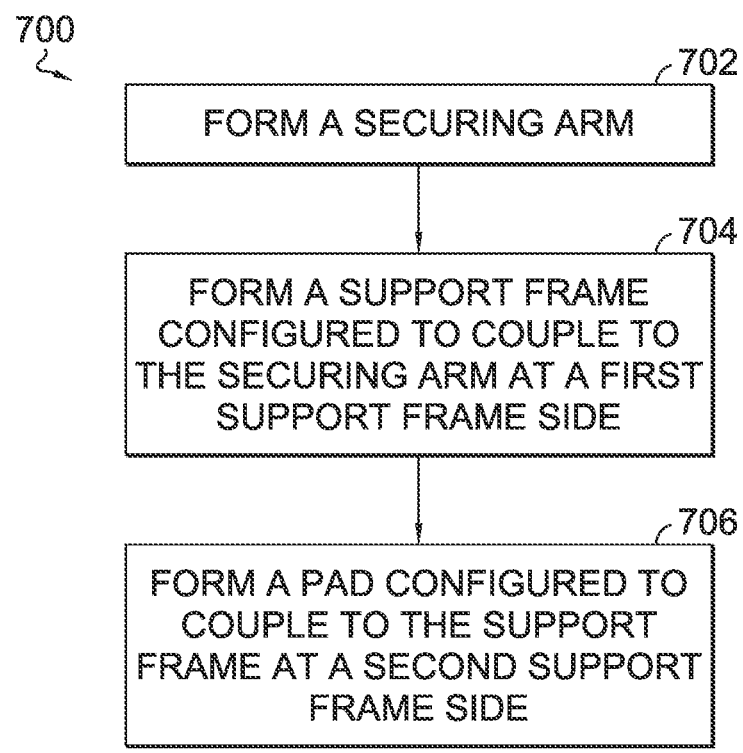
FIG. 7 illustrates an example method of manufacturing a load stabilizer, in accordance with an aspect described herein.

FIG. 7 provides an example method 700 of manufacturing a load stabilizer for use in stabilizing a load of a ground vehicle. At block 702, a securing arm is formed. The securing arm can be formed of any bend-resistant material having sufficient strength to withstand forces created by a mass of a support frame and pad. Metals having a bend force greater than the force created by the mass of the support frame and pad when accelerated into motion are sufficient for use. In an aspect, the securing arm or components thereof are formed of a metal comprising iron, tungsten, titanium, nickel, or chromium. The securing arm metal can be shaped or cast into one or more components. Other non-metallic materials can be formed into shape, cut to shape, three-dimensionally printed, or the like. Example components include a securing arm shaft, a securing arm bracket, a securing arm brace, and a securing arm mating bracket. Any combination of these components can be separately formed or formed as a single integrated piece. The method may include assembling components of the securing arm or configuring components of the securing arm for assembly.

At block 704, a support frame is formed. The support frame can be formed of any lightweight material, such as a material with a density equal to or less than about 0.300 lb/in$^3$. In aspects, the support frame or components thereof can be formed of a metal comprising aluminum, magnesium, titanium, or beryllium. Similarly, such metals can be cast or cut into the support frame or individual components of the support frame. Other non-metallic materials can be formed into shape, cut to shape, three-dimensionally printed, or the like. The support frame can be formed as a single support frame piece, or it can be formed into more than one support frame piece configured to assemble into the support frame. The method may include assembling components of the support frame or configuring components of the support frame for assembly.

At block 706, a pad is formed. The pad is formed such that it is configured to be coupled to the support frame. That is, the pad is formed congruent with the support frame. The pad can be formed from a natural or synthetic, flexible material. One example pad is formed using a closed-cell synthetic material. Polyethylene and polyurethane are two materials that can be used to form the pad. The pad can be formed from one or more pad pieces. Where a plurality of pad pieces is formed, the pad pieces can be configured to assemble into a pad congruent with the support frame. To size the pad congruent to the support frame or size the pad pieces, pieces of the pad material can be cut to shape. In another aspect, the pad material is formed into the shape. One method is to cut the pad to have recessed areas and raised areas corresponding to recessed areas and raised areas of a load surface for a specific load type. The pad can be formed using a blank of the load surface, a mold, a digital three-dimensional representation, or the like. The method can include coupling the pad to the support frame or configuring the pad to be coupled the support frame.

In general, method 700 can include forming the securing arm, the support frame, and the pad, or any combination of these components. For instance, method 700 may include forming only the securing arm, only the support frame, or only the pad. Method 700 may also include forming any combination of two of the securing arm, the support frame, or the pad.

Throughout this disclosure, the terms "step" or "block" are used to connote different elements of methods employed, the terms should not be interpreted as implying any particular order among or between various steps herein disclosed unless and except when the order of individual steps is explicitly stated.

The words "above" and "below," and other positional words throughout this disclosure are intended to describe a position relative to ground level. For example, a component that is "above" another component is relatively further from ground level, while a component that is "below" another component is relatively closer to the ground level. Other positional actions, such as "raise" and "lower" are also used relative to the ground level.

The words "couple," "mate," "affix," "fasten," "secure," "join," and other similar words used in this disclosure are intended to broadly describe joining components at a junction. These words are not meant to imply a particular type of or method of joining, unless explicitly stated otherwise. For instance, components may be joined at a junction using permanent methods or reversible methods. That is, components may be joined at a junction so that they are permanently affixed at the location or they are releasable affixed at the location. Similarly, to aid in describing the technology, certain components have been shown as separate components joined together at a junction. However, in practice, various components may be integrally formed, meaning that there may be no physical distinction between individual components. Each of these words is also intended to capture such integrally formed constructions. For example, components may be "joined" at a junction even where there is no physical or easily discernable difference between the components.

The word "about" is intend to mean±10%. For example, about 2.0 means a range equal to or less than 2.2, and equal to or greater than 1.8. Using another example, "about perpendicular" means having a relative angle of 90°±10%. Unless otherwise stated to the contrary, "parallel" and "perpendicular" as used herein are intended to mean "about parallel" and "about perpendicular."

Words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Example aspects of the technology that can be practiced from this disclosure include:

Aspect 1: A ground vehicle for transporting loads, the ground vehicle comprising: a motor having a brake; a securing arm coupled to the ground vehicle and movable between a first securing arm position and a second securing arm position, wherein the securing arm transitions between the first securing arm position and the second securing arm position by actuation of the motor, and wherein the securing arm is maintained at the second securing arm position by the brake; a support frame coupled to the securing arm at a first support frame side opposite a second support frame side; and a pad coupled to the support frame at the second support frame side.

Aspect 2: The ground vehicle of Aspect 1, further comprising a load-receiving area extending along a base plane, wherein the pad extends along a top plane that is parallel to and offset from the base plane.

Aspect 3: The ground vehicle of any of Aspects 1-2, further comprising a load-receiving area, wherein, when the securing arm is positioned at the first securing arm position, the pad is separated from the load-receiving area by a first distance and when the securing arm is positioned at the second securing arm position, the pad is separated from the load-receiving area by a second distance, the first distance being greater than the second distance.

Aspect 4: The ground vehicle of any of Aspects 1-3, wherein the pad is removably coupled to the support frame.

Aspect 5: The ground vehicle of any of Aspects 1-4, wherein the securing arm is formed of a metal comprising iron, tungsten, titanium, nickel, or chromium, and wherein the support frame is formed of a metal comprising aluminum, magnesium, titanium, or beryllium.

Aspect 6: The ground vehicle of any of Aspects 1-5, wherein the motor is a stepper motor and a controller of the stepper motor determines at least the second securing arm position based on a torque experienced by the stepper motor.

Aspect 7: The ground vehicle of any of Aspects 1-6, wherein the pad is formed of a closed-cell foam.

Aspect 8: A load stabilizer configured for stabilizing a load transported by a ground vehicle, the load stabilizer comprising: a securing arm; a support frame coupled to the securing arm at a first support frame side opposite a second support frame side; and a pad removably coupled to the support frame at the second support frame side.

Aspect 9: The load stabilizer of Aspect 8, wherein the securing arm comprises a securing arm shaft extending from a first securing arm shaft end to a second securing arm shaft end, the securing arm coupled to the support frame at the first securing arm shaft end, and the second securing arm shaft end extending beyond an outer edge of the support frame.

Aspect 10: The load stabilizer of Aspect 9, wherein the first securing arm shaft end is transversely coupled to a securing arm bracket, the securing arm bracket coupled to the support frame.

Aspect 11: The load stabilizer of any of Aspects 8-10, wherein the support frame comprises an open area enclosed by an outer edge of the support frame.

Aspect 12: The load stabilizer of any of Aspects 8-11, wherein the pad is removably coupled to the support frame using a hook-and-loop fastener.

Aspect 13: The load stabilizer of any of Aspects 8-12, wherein the securing arm is formed of a metal comprising iron, tungsten, titanium, nickel, or chromium.

Aspect 14: The load stabilizer of any of Aspects 8-13, wherein the support frame is formed of a metal comprising aluminum, magnesium, titanium, or beryllium.

Aspect 15: The load stabilizer of any of Aspects 8-14, wherein the pad is formed of a closed-cell foam.

Aspect 16: The load stabilizer of any of Aspects 8-15, wherein the pad is equal to or less than two inches.

Aspect 17: A method of assembling a load stabilizer for stabilizing a load transported by a ground vehicle, the method comprising: coupling a securing arm having a securing arm shaft to a first support frame side of a support frame by fastening the securing arm to the support frame at a first securing arm shaft end such that the securing arm shaft extends from the first securing arm shaft end to a second securing arm shaft end, the second securing arm shaft end extending beyond an outer edge of the support frame; and coupling a pad to a second support frame side of the support frame opposite the first support frame side.

Aspect 18: The method of Aspect 17, wherein coupling the securing arm to the support frame further comprises fastening a securing arm bracket to the first support frame side, the securing arm bracket transversely coupled to the securing arm shaft at the first securing arm shaft end.

Aspect 19: The method of any of Aspects 17-18, wherein coupling the pad to the second support frame side includes removably securing the pad to the second support frame side using a hook-and-loop fastener.

Aspect 20: The method of any of Aspects 17-19, wherein the securing arm is formed of a metal comprising iron, tungsten, titanium, nickel, or chromium, and the support frame is formed of a metal comprising aluminum, magnesium, titanium, or beryllium.

What is claimed is:

1. A ground vehicle for transporting loads, the ground vehicle comprising:
   a motor having a brake;
   a securing arm comprising a securing arm shaft having a first securing arm shaft end and a second securing arm shaft end, the second securing arm shaft end configured to engage a shuttle of the ground vehicle, the securing arm movable between a first securing arm position and a second securing arm position, wherein the securing arm transitions between the first securing arm position and the second securing arm position by actuation of the shuttle by the motor, and wherein the securing arm is maintained at the second securing arm position by the brake;
   a support frame coupled to the securing arm at a first support frame side opposite a second support frame side, the support frame comprising a first frame portion integrated with and perpendicular to a second frame portion, the second frame portion couples to the securing arm at a securing arm bracket at a first securing arm bracket end and a second securing arm bracket end, the second frame portion extends parallel with the securing arm bracket and perpendicular to the securing arm shaft, the support frame comprising an open area defined by the first frame portion being perpendicular to the second frame portion;
   a pad coupled to the support frame at the second support frame side; and
   a load receiving area comprising rollers.

2. The ground vehicle of claim 1, wherein the load-receiving area extends along a base plane, wherein the pad extends along a top plane that is parallel to and offset from the base plane.

3. The ground vehicle of claim 1, wherein, when the securing arm is positioned at the first securing arm position, the pad is separated from the load-receiving area by a first distance and when the securing arm is positioned at the second securing arm position, the pad is separated from the load-receiving area by a second distance, the first distance being greater than the second distance.

4. The ground vehicle of claim 1, wherein the pad is removably coupled to the support frame, the pad comprises a raised area having a location corresponding to a location of a recessed load area, and the pad comprises a recessed area having a location corresponding to a location of a raised load area.

5. The ground vehicle of claim 1, wherein the securing arm comprises a first securing arm brace and a second securing arm brace extending in a non-parallel relationship coupling to the securing arm bracket.

6. The ground vehicle of claim 1, wherein the motor is a stepper motor and a controller of the stepper motor determines at least the second securing arm position based on a torque experienced by the stepper motor.

7. The ground vehicle of claim 1, wherein the pad is formed of a closed-cell foam.

8. A load stabilizer configured for stabilizing a load transported by a ground vehicle, the load stabilizer comprising:
   a securing arm, the securing arm comprising a first securing arm brace and a second securing arm brace, the first securing arm brace and the second securing arm brace each couple to a securing arm mating bracket and extend in a non-parallel relationship coupling to a securing arm bracket, the securing arm comprising a securing arm shaft extending between the securing arm bracket and the securing arm mating bracket;
   a support frame coupled to the securing arm at a first support frame side opposite a second support frame side, the support frame comprising a first frame portion integrated with and perpendicular to a second frame portion, the second frame portion couples to the securing arm at the securing arm bracket at a first securing arm bracket end and a second securing arm bracket end, the second frame portion extends parallel with the securing arm bracket and perpendicular to the securing arm shaft the support frame comprising an open area defined by the first frame portion being perpendicular to the second frame portion; and
   a pad removably coupled to the support frame at the second support frame side.

9. The load stabilizer of claim 8, wherein the securing arm shaft extends from a first securing arm shaft end to a second securing arm shaft end, the securing arm coupled to the support frame at the first securing arm shaft end, the second securing arm shaft end extends beyond an outer edge of the support frame.

10. The load stabilizer of claim 9, wherein the first securing arm shaft end is transversely coupled to the securing arm bracket, the securing arm bracket coupled to the support frame.

11. The load stabilizer of claim 8, wherein the pad comprises a raised area having a location corresponding to a location of a recessed load area, and the pad comprises a recessed area having a location corresponding to a location of a raised load area.

12. The load stabilizer of claim 8, wherein the pad is removably coupled to the support frame using a hook-and-loop fastener.

13. The load stabilizer of claim 8, wherein the securing arm is formed of a metal comprising iron, tungsten, titanium, nickel, or chromium.

14. The load stabilizer of claim 8, wherein the pad is sized congruent to the support frame.

15. The load stabilizer of claim 8, wherein the pad is formed of a closed-cell foam.

16. The load stabilizer of claim 8, wherein the pad is equal to or less than two inches.

17. A method of assembling a load stabilizer for stabilizing a load transported by a ground vehicle, the method comprising:
   forming a securing arm by coupling a first securing arm brace and a second securing arm brace to a securing arm mating bracket, the first securing arm brace and second securing arm brace extending in a non-parallel relationship and coupling to a securing arm bracket, the securing arm bracket coupled to a securing arm shaft, the securing arm shaft extending from the securing arm bracket and coupling to the securing arm mating bracket;
   forming a support frame by coupling a first frame portion to a second frame portion, the first frame portion integrated with and perpendicular to the second frame portion, the support frame comprising an open area defined by the first frame portion being perpendicular to the second frame portion, the support frame comprising a first support frame side and a second support frame side;
   coupling the support frame at the first frame side at the second frame portion of the support frame, the second frame portion coupled to the securing arm bracket at a first securing arm bracket end and a second securing arm bracket end; and
   forming a pad configured to removably couple to the support frame at a second support frame side, the pad comprises a raised area having a location corresponding to a location of a recessed load area, and the pad comprises a recessed area having a location corresponding to a location of a raised load area.

18. The method of claim 17, wherein the securing arm shaft further comprises a first securing arm shaft end and a second securing arm shaft end, the second securing arm shaft end extending beyond an outer edge of the support frame.

19. The method of claim 17, wherein coupling the pad to the second support frame side includes removably securing the pad to the second support frame side using a hook-and-loop fastener.

20. The method of claim 17, wherein the second frame portion extends parallel with the securing arm bracket and perpendicular to the securing arm shaft.

* * * * *

UNITED STATES PATENT AND TRADEMARK OFFICE
CERTIFICATE OF CORRECTION

| | | |
|---|---|---|
| PATENT NO. | : 11,945,361 B2 | Page 1 of 1 |
| APPLICATION NO. | : 17/154747 | |
| DATED | : April 2, 2024 | |
| INVENTOR(S) | : Steven A. Weis, Michael J. Cassettari and Nathaniel Kissel | |

It is certified that error appears in the above-identified patent and that said Letters Patent is hereby corrected as shown below:

In the Claims

Claim 8, Column 17, Line 34:
The line reading "arm shaft the" should read -- arm shaft, the --.

Signed and Sealed this
Twenty-sixth Day of November, 2024

Katherine Kelly Vidal
*Director of the United States Patent and Trademark Office*